United States Patent [19]

Wroczynski

[11] Patent Number: 4,822,836

[45] Date of Patent: Apr. 18, 1989

[54] POLYPHENYLENE ETHER/POLYAMIDE BLENDS HAVING IMPROVED MELT FLOW CHARACTERISTICS

[75] Inventor: Ronald J. Wroczynski, Schenectady, N.Y.

[73] Assignee: General Electric Company, Albany, N.Y.

[21] Appl. No.: 98,579

[22] Filed: Sep. 18, 1987

[51] Int. Cl.[4] .......................... C08K 5/51; C08K 5/37; C08K 5/54; C08K 5/09
[52] U.S. Cl. ................................. 524/139; 524/262; 524/264; 524/275; 524/287; 524/288; 524/300; 524/319; 524/320; 524/538
[58] Field of Search ............... 524/287, 288, 300, 322, 524/319, 538, 320, 262, 264, 275, 277, 139

[56] References Cited

U.S. PATENT DOCUMENTS

| | | | |
|---|---|---|---|
| 4,315,086 | 2/1982 | Ueno et al. | 524/310 |
| 4,433,088 | 2/1984 | Haaf et al. | 525/68 |
| 4,600,741 | 7/1986 | Aycock et al. | 525/151 |
| 4,659,763 | 4/1987 | Gallucci et al. | 525/68 |

*Primary Examiner*—Lewis T. Jacobs
*Attorney, Agent, or Firm*—Francis T. Coppa

[57] ABSTRACT

Novel compatibilized polyphenylene ether-polyamide compositions are provided by this invention, comprising polyphenylene ether resin, polyamide resin, a compatibilizing agent, and a melt flow-improving compound. The compatibilizing agent may be selected from a wide variety of materials, such as saturated aliphatic polycarboxylic acids or derivatives thereof; various silane compounds; and functionalized polyphenylene ethers. A specific example of a compatibilizer is citric acid. Specific examples of melt flow-improving compounds are stearic acid, oleic acid, and linolenic acid.

13 Claims, No Drawings

POLYPHENYLENE ETHER/POLYAMIDE BLENDS HAVING IMPROVED MELT FLOW CHARACTERISTICS

STATEMENT OF THE INVENTION

The present invention relates to a compatibilized resin composition comprising a polyphenylene ether type resin and a polyamide resin. These resin compositions exhibit improved melt flow characteristics while maintaining other important physical properties such as surface appearance and impact strength.

BACKGROUND OF THE INVENTION

Polyphenylene ether is useful as a resin material for molding because of its good mechanical and electrical properties. However, it has poor oil-resistance. In order to solve this disadvantage, it is known that polyphenylene ether can be blended with polyamide which is resistant to oil (see, for example, Japanese Patent Laid-Open No. 16525/1981). The resulting composition exhibits improved oil resistance as compared to polyphenylene ether alone. However, polyphenylene ether and polyamide show poor compatibility with each other and, accordingly, properties intrinsic to these two resins, e.g., the excellent mechanical properties, are not fully exhibited when the resins are combined.

Finholt (U.S. Pat. No. 3,379,792) disclosed polymer blends wherein the processability of polyphenylene ether resins may be improved by blending with from 0.1 to 25% by weight of a polyamide. However, the advantages of the Finholt invention are limited by the fact that when the concentration of the polyamide exceeds 20% by weight, appreciable losses in other physical properties result. Specifically, there is no, or at best poor, compatibility between the polyphenylene ether and the polyamide such that phase separation of the resins occurs on molding or the molded article is inferior in mechanical properties.

Compatibility between the polyphenylene ether and polyamide phases can be improved by the addition of any of several compounds referred to as compatibilizers and the resin product may be referred to as compatibilized polyphenylene ether-polyamide. It is believed that the compatibilization may be accomplished by chemical or physical means, or both, and generally indicates a thorough dispersion of one resin in the other.

Ueno et al. (U.S. Pat. No. 4,315,086) disclosed polyphenylene ether blends having improved mechanical resistance without a loss of other mechanical properties by blending therewith a polyamide and a specific compound selected from the group consisting essentially of (A) liquid diene polymers, (B) epoxy compounds and (C) compounds having in the molecule both of (i) an ethylenic carbon-carbon double bond or carbon-carbon triple bond and (ii) a carboxylic acid, acid anhydride, acid amide imide, carboxylic acid ester, amino or hydroxy group.

Kasahara et al. (EP No. 46040) disclose the use of a copolymer comprising units of a vinyl aromatic compound and either an alpha, beta-unsaturated dicarboxylic acid anhydride or an imide compound thereof as a modifier to an impact resistant polyphenylene ether-polyamide blend for improved heat resistance and oil resistance.

Aycock et al. (U.S. Pat. Nos. 4,600,741 and 4,642,358) disclose the use of an acyl functional compatibilizer, preferably the reaction product of polyphenylene ether with trimellitic anhydride acid chloride, for compatibilized for polyphenylene ether-polyamide blends. Other suitable compatibilization techniques are discussed below.

It is an object of the present invention to enhance the melt flow characteristics of such compatibilized PPE-polyamide composites by incorporation therein of certain effective carboxylic acids and related compounds.

DESCRIPTION OF THE INVENTION

It has now been found that in a compatibilized resin composition comprising (a) a polyphenylene ether type resin, (b) a polyamide resin, (c) a compatibilizer for (a) and (b), and additionally if desired the below-described optional materials, the melt flow characteristics of the resin composition are improved by inclusion therein of effective amounts of certain organic carboxylic acids and derivatives thereof. Melt flow characteristics which are particularly improved are those exhibited by a molten resin composition during processing or fabrication into shaped articles. These characteristics are exemplified by such properties as melt viscosity and flow channel. The improvement of the invention is particularly useful for compatibilized polyphenylene ether-polyamide compositions which utilize a polyamide resin in which the amount of terminal amino group is greater than the amount of terminal carboxyl group, since these blends are generally relatively poorer in flow characteristics, especially in comparison to crystalline resins.

Thus, the present invention provides a compatibilized resin composition comprising:
(a) a polyphenylene ether resin,
(b) a polyamide resin,
(c) a compatibilizer compound for (a) and (b), and
(d) a melt flow improving amount of an organic carboxylic acid, or acid anhydride derivative thereof, where the carboxylic acid is selected from the group consisting of straight chain fatty acids and compounds of the general formula:

Wherein R is monovalent alkyl or aralkyl radical having about 4 to 32 carbon atoms and R' is —OH or halogen.

It is believed that carboxylic acids where R contains less than about 4 carbon atoms would also have a melt flow improving effect in compositions of the invention but would, however, be difficult to maintain in the resin melt mixture under the typically hot conditions of a conventional thermoplastic extruder. Compounds where R is greater than about 32 could also be effective if utilized in sufficiently effective quantities but optimum compositions can probably be achieved at practical concentrations of carboxylic acids chosen from those described by the general formula above. Useful carboxylic acids and derivatives falling within the above definition are commercially available in a variety of grades which are often mixtures, typically based on purity. Straight chain fatty acids are particularly preferred. Common names for such acids include, without limitation: stearic, palmitic, lauric, benhenic, arachidic, menhadenic, oleic, linolenic, linoleic, erucic, and the like.

Preferably, the compatibilized resin compositions of the present invention comprise:

(a) 5 to 80 parts by weight of a polyphenylene ether type resin,
(b) 95 to 20 parts by weight of a polyamide resin,
(c) 0.01 to 10 parts by weight of a compatibilizer compound based upon the total amount of components (a) and (b), and
(d) about 0.01 to 10 parts by weight and preferably about 0.1 to 3.0 parts of the melt flow improving carboxylic acid or derivative thereof, also based upon the weight of (a) and (b) taken together.

The compatibilized resin compositions of the present invention, in addition to components (a), (b), (c) and (d), can further comprise:
optionally, (e) a rubbery material,
optionally, (f) a filler,
optionally, (g) a flame retardant, and
optionally, (h) an antimony-compound.
These optional components can be used singly or in any combination. The preferred amount of optional components are:
optionally, (e) 0 to 20 parts by weight of a rubbery material per 100 parts by weight of the total amount of components (a) and (b),
optionally, (f) 5 to 150 parts by weight of a filler per 100 parts by weight of the total amount of components (a) and (b),
optionally, (g) 0 to 40 parts by weight of a flame retardant per 100 parts by weight of the total amount of components (a) and (b), and optionally, (h) 0 to 20 parts by weight of an antimony compound per 100 parts by weight of the total amount of components (a) and (b). Other conventional additives such as pigments, stabilizers and processing acids may be utilized in compositions of the invention.

The polyphenylene ether type resin used herein is known per se and is generically defined by the general formula:

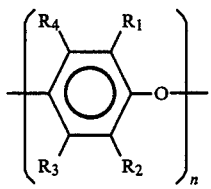

wherein $R_1$, $R_2$, $R_3$ and $R_4$ are a monovalent substituent selected from a hydrogen atom, a halogen atom, an alkyl group, an alkoxy group, a haloalkyl and haloalkoxy group in which at least 2 carbon atoms are present between a halogen atom and a phenyl ring with the exclusion of those having tertiary alpha-carbon atoms and n is an integer representing the degree of polymerization and is preferably at least 50. The polymer may be a homopolymer or a copolymer of two or more comonomers represented by the above general formula. In preferred examples, $R_1$ and $R_2$ are an alkyl group of 1 to 4 carbon atoms, and $R_3$ and $R_4$ are a hydrogen atom or an alkyl group of 1 to 4 carbon atoms. Exemplary preferable polyphenylene ethers are
poly(2,6-diethyl-1,4-phenylene) ether,
poly(2-methyl-6-ethyl-1,4-phenylene) ether,
poly(2-methyl-6-ethyl-1,4-phenylene) ether,
poly(2-methyl-6-propyl-1,4-phenylene) ether,
poly(2,6-dipropyl-1,4-phenylene) ether,
poly(2-ethyl-6-propyl-1,4-phenylene) ether, and
poly(2,6-diisopropyl-1,4-phenylene) ether.

Particularly preferred is poly(2,6-dimethyl-1,4-phenylene) ether.

A typical polyphenylene ether copolymer is a copolymer in which a part of the aforesaid polyphenylene ether recurring unit is replaced with tri-alkyl substituted phenyl, such as 2,3,6-trimethyl phenol.

Further, styrene type compounds may be grafted onto these polyphenylene ethers to yield copolymers. Illustrative of styrene type compound-grafted polyphenylene ethers are copolymers grafted with styrene, alpha-methyl styrene, vinyl toluene and chorostyrene.

Polyamide resins are known per se and are also commonly known as nylon resins. Polyamides suitable for the preparation of the compositions of the present invention may be obtained by polymerizing a monoamino-monocarboxylic acid or a lactam thereof having at least 2 carbon atoms between the amino and carboxylic acid group or by polymerizing a diamine which contains at least 2 carbon atoms between the amino groups and a dicarboxylic acid; or by polymerizing a monoaminocarboxylic acid or a lactam thereof as defined above together with a diamine and a dicarboxylic acid. The dicarboxylic acid may be used in the form of a functional derivative thereof, for example an ester or acid chloride.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the —CO—NH—group in the case of a lactam. As particular examples of aminocarboxylic acids and lactams there may be mentioned gamma-aminocaproic acid, butyrolactam, pivalolactam, carpolactam, capryllactam, enantholactam, undecanolactam, dodecanolactam and 3- and 4-aminobenzoic acids.

Examples of diamines suitable for preparing the polyamides include diamines of the general formula

$H_2N(CH_2)_nNH_2$ wherein n is an integer of from 2 to 16, such as trimethylenediamine, tetramethylenediamine, pentamethylenediamine, octamethylenediamine and especially hexamethylenediamine.

The dicarboxylic acids suitable for preparing the polyamides may be aromatic, for example isophthalic and terephthalic acids. Preferred dicarboxylic acids are of the formula

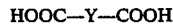

HOOC—Y—COOH wherein Y represents a divalent aliphatic group containing at least 2 carbon atoms, and examples of such acids are sebacic acid, octadecanedoic acid, suberic acid, glutaric acid, pimelic acid and adipic acid.

Typical examples of the polyamides or nylons, as these are often called, include for example polyamides 6, 6/6, 11, 12, 4/6, 6/3, 6/4, 6/10 and 6/12 as well as polyamides resulting from terephthalic acid and trimethyl hexamethylene diamide, polyamides resulting from solipic acid and meta xylylenediamines, polyamides resulting from adipic acid, azelaic acid and 2,2-bis(p-aminocyclohexyl) propane and polyamides resulting from terephthalic acid and 4,4'-diamino-dicyclohexylmethane. Preferred polyamides are the polyamides 6, 6/6, 4/6, 11 and 12, most preferably polyamide 6/6 or polyamide 6.

In certain embodiments of the present invention, it is preferred that the amount of terminal amino group is greater than the amount of terminal carboxylic group in the polyamide. Such polyamides may be obtained by adding an excessive amount of, for instance, compounds having a group reactive with a carboxylic group, such a diamines, to a polymerization system of the polyamide. Alternatively, such polyamides may be obtained by reacting the polyamide with, for instance, compounds having a group reactive with a carboxylic group after polymerization of the polyamide. The terminal amine group is present also in a minimum amount sufficient to interact with the compatibilizer, component (c), to help effect compatibilization between (a) and (b). Further information regarding the use of so-called high amine-end group polyamides can be found in U.S. Ser. No. 022,836 filed Mar. 6, 1987.

Polyphenylene ethers, component (a), and polyamides component (b), are blended in any proportion, preferably in a range of 5 to 80 parts by weight and a range of 95 to 20 parts by weight respectively. If the amount of component (b) exceeds the above limitation, the desired properties of component (a) are difficult to maintain. On the other hand, if the amount of component (b) falls below the lower limit, the purpose of adding component (b), i.e., improvement of the oil resistance level, is difficult to attain. Preferably, a weight ratio of component (a) to component (b) is 30 to 70 : 70 to 30.

For best results, component (c) is blended in an amount of 0.01 to 10 parts by weight, preferably 0.01 to 5 parts by weight, more preferably 0.1 to 2 parts by weight, to each 100 parts by weight of the total of components (s) and (b). If the amount is less than 0.01 parts by weight, the desired effect as a compatibilizer is not attained. On the other hand, if the amount exceeds 10 parts by weight, surface appearance of the molded article is sometimes poor. Component (c) of the present invention can be any compound or group of compounds known to effect compatibility between a polyphenylene ether resin, component (a), and a polyamide resin, component (b). Mixtures of compatibilizers can be used.

Suitable compatibilizers preferably include:

(i) a compound having (1) one or more of a carbon-carbon double or triple bond and (2) one or more functional groups selected from a carboxylic acid, acid anhydride, acid amide, imide, carboxylic ester or epoxy group;

(ii) a saturated aliphatic polycarboxylic acid or derivative thereof;

(iii) a silane compound having in its molecular structure both (a) at least one silicon atom which is bonded to a carbon atom via an oxygen bridge and (b) at least an ethylene carbon-to-carbon double bond or a carbon-to-carbon triple bond and/or a functional group selected from an amine group and a mercapto group, the functional group not being bonded directly to the silicon atom;

(iv) a functionalized polyphenylene ether consisting of a reaction product of (a) a polyphenylene ether and (b) a compound of the general formula (i)-Z-(ii), wherein (i) is at least a group of the formula [X-C(O)]- with X=F, Cl, Br, I, OH, —OR, or —O—C(O)—R with R=H, alkyl or aryl, wherein (ii) is at least a carboxylic acid, acid anhydride, acid amide, imido, carboxylic acid ester, amino or hydroxyl group, and in which the groups (i) and (ii) are covalently bonded together via a bridge Z, Z being a bivalent hydrocarbon radical;

(v) an oxidized polyolefin wax, optionally in combination with an organic phosphite;

(vi) a copolymer with units of a vinylaromatic compound and of an alpha-beta unsaturated dicarboxylic acid or dicarboxylic acid anhydride or a copolymer with units of a vinylaromatic compound of an imide compound of an alpha-beta unsaturated dicarboxylic acid. This compatibilizer can be present in the preferred amount of from 0.5 to 100 parts by weight per 100 parts by weight of polyamide plus polyphenylene ether; and (vii) the reaction product of (a) 1,2-substituted olefinic compound with carboxyl group or acid anhydride group, (b) a polyphenylene ether and (c) a radical initiator. This compatibilizer can be present in the preferred amount of from 0.5 to 150 parts by weight per 100 parts by weight of polyamide plus polyphenylene ether.

The agents for improving the compatibility mentioned in (iv) and (vii) can replace the polyphenylene ether, component (a) in the polymer mixtures according to the invention, entirely or partly.

Component (c) used in the present invention when of type (i) includes maleic anhydride, maleic acid, fumaric acid, maleimide, maleic hydrazide, and reaction products of maleic anhydride with diamines. Many further examples of suitable compounds are given in the aforementioned U.S. Pat. No. 4,315,086.

Compound (c) may have two or more of the aforesaid unsaturated bonds (1) and/or two of more of the aforesaid functional groups (2).

Compound (c) used in the present invention, when of type (ii), the saturated aliphatic polycarboxylic acid or a derivative thereof, is represented by the formula:

$$(R^{I}O)_{m}R(COOR^{II})_{n}(CONR^{III}R^{IV})_{s}$$

wherein R is a linear or branched chain, saturated aliphatic hydrocarbon of from 2 to 20 and preferably 2 to 10, carbon atoms; $R^{I}$ is selected from the group consisting of hydrogen, alkyl, aryl, acyl and carbonyl and dioxy group of 1 to 10, preferably 1 to 6, more preferably 1 to 4, carbon atoms, most preferably hydrogen; $R^{II}$ is selected from the group consisting of hydrogen, alkyl and aryl group of from 1 to 20 carbon atoms, preferably from 1 to 10 carbon atoms; each of $R^{III}$ and $R^{IV}$ is selected from the group consisting of hydrogen, an alkyl and aryl group of from 1 to 10, preferably from 1 to 6, most preferably 1 to 4, carbon atoms; m is equal to 1 and (n + s) is greater than or equal to 2, preferably equal to 2 or 3, and n and s are each greater than or equal to zero and $(OR^{I})$ is in an alpha or beta position to a carbonyl group and at least two carbonyl groups are separated by 2 to 6 carbon atoms.

Examples of the derivatives of the saturated aliphatic polycarboxylic acids according to the invention include esters, amides, anhydrides, hydrates and salts of the saturated aliphatic polycarboxylic acids. Illustrative of the saturated aliphatic polycarboxylic acids are citric acid, malic acid and agaricic acid. Illustrative of acid esters include acetyl citrate and mono- or di- stearyl citrates and the like. Suitable acid amides include for example N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Preferably, component (c), when a saturated aliphatic polycarboxylic acid, is citric or malic acid. The salts include calcium malates, calcium citrate, potassium malate and potassium citrate. Compatibilizers of type (ii) are more fully described in PCT Application No. WO 85/05372 published Dec. 5, 1985, which corresponds to U.S. Ser. Nos. 736,489 and 736,490 filed May 20, 1985.

Component (c) used in the present invention, when of type (iii), includes compatibilizers which have at least one silicon atom which is bonded to a carbon atom via an oxygen bridge. For that purpose, at least an alkoxy group or an acetoxy group will usually be present in the silane. Moreover, silicon atoms which are bonded together via an oxygen bridge, i.e. siloxane groups, may be present in the silane derivative. In the following characteristics features, namely the presence in the molecule of one or more carbon-to-carbon double bonds or triple bonds, an amino group and/or a mercapto group. The carbon-to-carbon double to triple bond may be coupled directly to the silicon atom. The mercapto group or the amino group may not be coupled directly to a silicon atom. Examples of suitable silane derivatives are: gamma aminopropyl triethoxy silane; vinyl-tris-(2-methoxy-ethoxy) silane; 5-(bicycloheptenyl) triethoxy silane and gamma mercapto-propyl trimethoxyl silane.

Component (c) used in the present invention, when of type (iv), includes agents for improving compatibility which can be obtained by reacting a polyphenylene ether with, for example, chloroethyanoyl succinic anhydride; trimellitic anhydride acid chloride; chloroformyl succinic anhydride; 1-acetoxyacetyl-3,4-dibenzoic acid anhydride; trimellitic anhydride acid acetic anhydride and the acid chloride of terephthalic acid. The compounds formed can be purified by precipitation in methanol or acetone. These agents may be used in combination with primary or secondary amines, for example, butyl amine, dibutyl amine, n-octadecyl amine. Preferred are the polyphenylene ethers functionalized with trimellitic anhydride acid chloride and the method by which they can be obtained is described in Aycock et al., U.S. Pat. No. 4,600.741.

Component (c) used in the present invention, when of type (vi), includes the compounds mentioned in EP-A No. 0 046 040 and EP-A No. 0 147 874. Examples of these compounds are styrene-maleic acid anhydride copolymers, styrene-maleic acid anhydride methacrylate terpolymers, styrene-maleic acid anhydride acrylate terpolymers, and the rubber-modified variants of these compounds.

Component (c) used in the present invention, when of type (vii), includes the compounds and their mode of preparation which are disclosed in Japanese Patent Applications Nos. 59/059,725; 59/086,653 and 59/066,452. Component (c) of this type relates to the reaction product of (a) a 1,2-substituted olefinic compound with carboxylic group or acid anhydride group (for example, maleic acid anhydride), (b) a polyphenylene ether and (c) a radical initiator (for example, benzoyl peroxide).

The optional rubbery material (e) used in the present invention includes natural or synthetic polymeric materials elastic at room temperature. Illustrative of such are natural rubber, butadiene polymer, butadiene-styrene copolymer including random copolymer, block copolymer, graft copolymer and any other structures, isoprene polymer, chloro-butadiene polymer, butadiene-acrylonitrile copolymer, isobutylene polymer, isobutylene-butadiene copolymer, isobutylene-isoprene copolymer, acrylic ester polymer, ethylene-propylene copolymer, ethylene-propylene-diene copolymer, Thiokol rubber, polysulfide rubber, polyurethane rubber, polyether rubber such as polypropylene oxide, and epichlorohydrin rubber.

These optional rubbery materials may be prepared by any of known methods, such as emulsion polymerization or solution polymerization, using any of known catalysts such as peroxides, trialkyl aluminum, lithium halide or nickel catalysts. The rubbery materials may have various degrees of crosslinking and various ratios between micro-structures such as cis, trans and vinyl. They may be particles of various average sizes. Further, the copolymers may be random copolymers, block copolymers or graft copolymers. The rubbery materials may also be copolymers with other monomers such as olefins, dienes, aromatic vinyl compounds, acrylic acid, acrylic esters and methacrylic ester. These comonomers may be copolymerized in any manner of random copolymerization, block copolymerization or graft copolymerization. Illustrative of these monomers are, for instance, ethylene, propylene, styrene, chlorostyrene, alpha-methylstyrene, butadiene, isoprene, chlorobutadiene, butene, isobutylene, acrylic acid, methyl acrylate, ethyl acrylate, butyl acrylate, methyl methacrylate and acrylonitrile. Partially modified rubbery materials may also be used in the invention, such as polybutadiene having hydroxy or carboxy-modified terminals, and partially hydrogenated styrene-butadiene block copolymers. Among the latter, triblock copolymers known as SEBS rubber, and diblock copolymers known as SEP rubber are particularly useful.

When used, rubbery material (e) preferably is blended in an amount of 0 to 20 parts by weight to each 100 parts by weight of the total of components (a) and (b). Component (e) is generally used to improve impact resistance of a molded article. In the case of a molded article which does not contain component (e), surface appearance is typically improved, though improvement in impact resistance is not as good.

Optional filler (f) when used in the present invention includes inorganic and organic fillers which are usually added to plastics, such as glass fibers, carbon fibers, metal fibers, glass beads, asbestos, wollastonite, calcium carbonate, talc and barium sulfate. These may be used alone or in combination. Among these fillers, glass fibers are preferably used, which preferably have a fiber diameter of 6 to 30 microns and a fiber length of 30 microns or more.

When a filler (f) is used, the composition of the invention preferably contains 5 to 150 parts by weight of the filler per 100 parts by weight of the total amount of components (a) and (b). If the filler is utilized in an amount outside the above range, it may not be possible to obtain a composition having the improved desired properties. That is, if the amount is less than 5 parts by weight, the desired reinforcing effect may not be attained. On the other hand, if the amount exceeds 150 parts by weight, surface appearance of a molded article can be unsatisfactory.

Regarding optional flame retardant (g), phosphorous type flame retardants usually used in polyphenylene oxide resins or nitrogen type flame retardants usually used in polyamides may be used. However, halogen type flame retardants are preferred. When optional antimony compound (h) is used together with optional flame retardant (g), fire resistance is further enhanced. Particularly, halogenated flame retardants such as brominated polystyrene, brominated polyphenylene oxide, brominated bisphenol series epoxy compounds, are preferred. Brominated polystyrene is a flame retardant which has excellent heat stability. A resin composition containing brominated polystyrene can generally reside in a molding machine at 280° C. for 10 minutes without discoloring. Compositions which contain neither component (g) nor component (h) are used in applications where fire resistance is not required.

Further, the compositions may contain other additives which are usually used, such as pigments and stabilizers, as occasion demands.

The aforesaid components (a) to (d) alone, or with the optional components (e) to (h) alone or in combination, may be mixed in any order and heat melted to be injection molded. The resin compositions according to the invention have highly improved melt flow characteristics and provide molded products having good mechanical strength and surface appearance.

To avoid degradation of the polyamide component it is often desirable to split the polyamide into two portions. The first is blended with the other components which then is typically compounded in a multi-screw extruder. The second polyamide component is fed to the extruder in a point downstream from the first. Adequate compounding of the blend is achieved without over exposure of the polyamide component to the last shear condition of a typical extruder.

The invention is explained below in further detail by the examples, which should not be construed to limit the invention in any manner.

The above mentioned patents, patent applications and other publications are incorporated herein by reference.

Other modifications and variations of the invention are possible and will occur to those skilled in the art in light of the above-detailed disclosure. It is to be understood, therefore, that changes may be made in particular embodiments shown without departing from the spirit of the invention or its scope as defined in the appended claims.

EXAMPLES 1-3

Blends in accordance with the invention were prepared in the following manner. All parts are by weight.

| COMPONENTS | PARTS |
|---|---|
| poly(2,6-dimethyl-1,4-phenylene ether) | 49 |
| polyamide | 10 |
| rubbery impact modifier | 10 |
| compatibilizing agent | 0.7 |
| melt flow improving agent | * |
| downstream polyamide | 31 |

*The amount and type of melt flow improving agent is specified under materials in each of the following Tables. The foregoing constituents except for the downstream polyamide are combined, as by blending, and directed to the feed throat of a thermoplastic extruder. In these examples a 30 mm Werner and Pfleiderer twin screw was utilized. This extruder was configured with a downstream addition port to which was added 31 parts of the polyamide resin. The thermoplastic extrudate was cool-water quenched and pelletized. The compositions were then molded into test specimens on a three ounce Newbury injection molding machine. Each of the following Tables indicates tests and physical properties for the compositions.

The polyphenylene ether utilized in these examples had an intrinsic viscosity of 0.46 dl/gm as measured in chloroform at 25 degrees C. The polyamide used for both additions was polyamide 6 having a relative viscosity of about 47 in formic acid. The polyamide is available from Allied Signal Co. as grade XPN1250 nylon 6 and has a higher concentration of amine end groups compared to acid end groups. The compatibilizing agent used in these examples was citric acid. The rubbery impact modifier was Shell KRATON KD1101-2 styrene-butadiene-styrene triblock copolymer, available as pellets.

The stearic acid was Hystrene 5016, a mixture available from Humco Division of Witco Co.

The Hoechst Wax "S" is a $C_{28}$-$C_{32}$ linear carboxylic acid available from Hoechst Chemical.

The phthalic anhydride is aromatic carboxylic anhydride available from Aldrich Co.

In the PROPERTIES section of the Table, MV indicates melt viscosity at 540 degrees F., measured in reciprocal seconds. FC is the flow channel for a molded specimen as measured in inches. The test is conducted with a channel flow tool on an injection molding machine where the melt was shot at a temperature of 550F. and 800 psi. HDT is the heat distortion temperature in degrees F. Dynatup energy values are reported for room temperature (RT) and −20 degrees F. The designators "b,d,b/d, and d/b" indicate the mode of failure in the Dynatup test: b is brittle failure, d is ductile failure, and b/d and d/b are a combination of both. Tensile properties are indicated by percent elongation (% elong), tensile yield (TYS) in psi, and tensile ultimate strength (TUS) in psi.

TABLE 1

|  | CONTROL A | 1 | 2 | 3 |
|---|---|---|---|---|
| MATERIALS |  |  |  |  |
| STEARIC ACID |  | 0.5 |  |  |
| HOESCHST WAX 'S' |  |  | 0.8 |  |
| PHTHALIC ANHYDRIDE |  |  |  | 0.2 |
| PROPERTIES |  |  |  |  |
| MV @ 540 F. |  |  |  |  |
| 100 sec−1 | 10450 | 10156 | 12601 | 12475 |
| 1500 sec−1 | 3338 | 2536 | 3155 | 2900 |
| FC (in) | 14.75 | 18 | 16 | 17 |
| HDT (F) @ 66 psi | 364 | 354 | 345 | 358 |
| N. Izod (rt) | 9.2 | 11.3 | 12.7 | 12.1 |
| N. Izod (−20 F.) | 2.2 | 2.9 | 3.5 | 3.2 |
| DYNATUP (E) @ RT | 480 | 534 | 511 | 534 |
| d,b | d | d | d | d |
| DYNATUP (E) @ −20 F. | 144 | 480 | 516 | 432 |
| d,b | b | b | db | bd |
| TENSILE |  |  |  |  |
| % ELONG | 33 | 50 | 69 | 96 |
| TYS (psi) | 8760 | 8111 | 7790 | 7636 |
| TUS (psi) | 7480 | 7289 | 7170 | 7308 |

EXAMPLE 4

Table 2 describes a blend made in accordance with the procedure of Examples 1−3 above wherein the first addition of the polyamide component utilizes a nylon resin having a nearly equal amount of amine and acid end groups. This nylon component is known as 8202NL, available from Allied-Signal, and was used in the amount of 10 parts in the blend at the feedthroat of the extruder. The downstream addition of nylon was the same as for examples 1-3.

TABLE 2

|  | CONTROL B | 4 |
|---|---|---|
| MATERIALS |  | - |
| STEARIC ACID |  | 0.5 |
| PROPERTIES |  |  |
| MV @ 540 F. |  |  |
| 100 sec−1 | 11775 | 9058 |
| 1500 sec−1 | 2782 | 2284 |
| FC (in) | 17 | 20 |
| HDT (F) @ 66 psi | 355 | 346 |

TABLE 2-continued

|  | CONTROL B | 4 |
|---|---|---|
| N. Izod (rt) | 11.4 | 11.4 |
| N. Izod (−20 F.) | 3.1 | 3.1 |
| DYNATUP (E) @ RT d,b | 561 d | 610 d |
| DYNATUP (E) @ −20 F. d,b | 596 b | 604 b |
| TENSILE |  |  |
| % ELONG | 109 | 132 |
| TYS (psi) | 7946 | 7679 |
| TUS (psi) | 7505 | 7616 |

EXAMPLES 5-6

Table 3 indicates several blends prepared in accordance with the procedure for Examples 1-3 above except that a different polyamide resin was utilized at both the original and downstream addition ports. A high amine end group nylon 6 known as Ube 1013A from Ube Chemicals was utilized.

TABLE 3

|  | CONTROL C | 5 | 6 |
|---|---|---|---|
| MATERIALS |  |  |  |
| STEARIC ACID |  | 0.5 |  |
| HOESCHST WAX 'S' |  |  | 0.8 |
| PROPERTIES |  |  |  |
| MV @ 540 F. |  |  |  |
| 100 sec−1 | 10902 | 12592 | 10421 |
| 1500 sec−1 | 2736 | 2135 | 2664 |
| FC (in) | 18 | 19.5 | 19 |
| HDT (F) @ 66 psi | 356 | 354 | 343 |
| N. Izod (rt) | 10.8 | 10.5 | 12 |
| N. Izod (−20 F.) | 3.1 | 3.5 | 3.4 |
| DYNATUP (E) @ RT d,b | 564 d | 560 d | 630 d |
| DYNATUP (E) @ −20 F. d,b | 681 b | 632 b | 643 b |
| TENSILE |  |  |  |
| % ELONG | 129 | 87 | 103 |
| TYS (psi) | 8431 | 8155 | 7940 |
| TUS (psi) | 7558 | 7300 | 7337 |

EXAMPLES 7-8

Formulations were prepared in accordance with the procedure of Examples 1-3 above but which additionally include 3 parts by weight of titanium dioxide. Also, the polyphenylene ether utilized in Examples 7-25 had an intrinsic viscosity of 0.40 dl/gm as measured above. Table 4 indicates physical properties for Examples 7 and 8.

TABLE 4

|  | CONTROL D | 7 | 8 |
|---|---|---|---|
| MATERIALS |  |  |  |
| STEARIC ACID PROPERTIES |  | 0.25 | 0.5 |
| MV @ 540 F. |  |  |  |
| 100 sec−1 | 13127 | 9867 | 9745 |
| 1500 sec−1 | 3189 | 2465 | 2455 |
| FC (in) | 16.25 | 16.5 | 18 |
| HDT (F) @ 66 psi | 354 | 357 | 349 |
| N. Izod (rt) | 10.1 | 10.5 | 9.9 |
| DYNATUP (E) d,b | 597 d | 603 d | 585 d |
| FLEX YLD (kpsi) | 11.9 | 11.8 | 12.1 |
| FLEX MOD (kpsi) | 292 | 298 | 301 |
| TENSILE |  |  |  |
| % ELONG | 122 | 73 | 57 |
| TYS (psi) | 8381 | 8150 | 8410 |
| TUS (psi) | 7309 | 7055 | 7150 |

EXAMPLES 9-12

Table 5 indicates physical properties for compositions prepared in accordance with Examples 7-8 above. The amount of stearic acid melt flow improving additive was varied to determine its effectiveness at varying levels.

TABLE 5

|  | CONTROL E | 9 | 10 | 11 | 12 |
|---|---|---|---|---|---|
| MATERIALS |  |  |  |  |  |
| STEARIC ACID PROPERTIES |  | 0.5 | 0.75 | 1 | 1.5 |
| MV @ 540 F. |  |  |  |  |  |
| 100 sec−1 | 10891 | 5748 | 5143 | 5204 | 5531 |
| 1500 sec−1 | 2524 | 1607 | 1528 | 1522 | 1642 |
| HDT (F) @ 66 psi | 358 | 321 | 338 | 329 | 329 |
| N. Izod (rt) | 10 | 10.7 | 10.5 | 9.6 | 10.8 |
| DYNATUP (E) d,b | 647 d | 651 d | 602 d | 596 d | 535 d |
| FLEX YLD (kpsi) | 14.2 | 14.4 | 14.6 | 13.8 | 13.8 |
| FLEX MOD (kpsi) | 320 | 328 | 327 | 311 | 306 |
| TENSILE |  |  |  |  |  |
| % ELONG | 59 | 45 | 38 | 37 | 33 |
| TYS (psi) | 9326 | 9751 | 9688 | 9511 | 9232 |
| TUS (psi) | 7943 | 7938 | 7891 | 7649 | 7554 |

EXAMPLES 13-19

Table 6 indicates physical properties for compositions prepared in accordance with Examples 7-8 above, where a variety of additives are compared. Compaative Examples 14-17 indicate that long chain fatty amides are less effective in promoting melt flow property improvements compared to carboxylic acids used in compositions of the invention. Similarly, comparative Example 19 indicates that esters and salts of fatty acids are also less effective.

The KEMAMIDE P-181 is oleyl palmitamide, S-180 is stearyl stearamide and E-221 is erucyl erucamide, all of which are available from Humko Division of Witco. Hoechst Wax OP is a mixture of butylene glycol esters and calcium salts derived from carboxylic acids similar to those in Hoechst Wax S, described above.

TABLE 6

|  | CONTROL F | 13 | 14* | 15* | 16* | 17* | 18 | 19* |
|---|---|---|---|---|---|---|---|---|
| MATERIALS |  |  |  |  |  |  |  |  |
| STEARIC ACID |  | 2 |  |  |  |  |  |  |
| KEMAMIDE P-181 |  |  | 0.5 |  |  |  |  |  |
| KEMAMIDE S-180 |  |  |  | 0.5 |  |  |  |  |
| KEMAMIDE E-221 |  |  |  |  | 0.5 | 1 |  |  |
| HOERCHST WAX S |  |  |  |  |  |  | 0.5 |  |

TABLE 6-continued

|  | CONTROL F | 13 | 14* | 15* | 16* | 17* | 18 | 19* |
|---|---|---|---|---|---|---|---|---|
| HOERCHST WAX OP |  |  |  |  |  |  |  | 0.5 |
| PROPERTIES |  |  |  |  |  |  |  |  |
| MV @ 540 F. |  |  |  |  |  |  |  |  |
| 100 sec−1 | 8068 | 6526 | 8604 | 10209 | 12416 | 13523 | 10770 | 10664 |
| 1500 sec−1 | 2831 | 1568 | 2777 | 2651 | 2961 | 3099 | 2569 | 2833 |
| FC (in) | 17.25 | 33 | 17 | 17 | 16.5 | 15.75 | 19.5 | 17.5 |
| HDT (F) @ 66 p | 367 | 340 | 356 | 351 | 348 | 340 | 348 | 347 |
| N. Izod (rt) | 5.6 | 3.7 | 9.2 | 9.4 | 9.3 | 10.6 | 10.1 | 9.5 |
| N. Izod (−20 F.) |  |  |  |  |  |  |  |  |
| DYNATUP (E) | 612 | 386 | 587 | 550 | 540 | 528 | 548 | 578 |
| d,b | d | bd | d | d | d | d | d | d |
| FLEX YLD (kpsi) | 14.1 | 13.2 | 12.9 | 12.9 | 12.6 | 12.4 | 12.5 | 12.9 |
| FLEX MOD (kpsi) | 356.2 | 339.3 | 331.2 | 353 | 334.7 | 323.4 | 335.5 | 325.3 |
| TENSILE |  |  |  |  |  |  |  |  |
| % ELONG | 62 | 57 | 62 | 50 | 54 | 47 | 102 | 64 |
| TYS (psi) | 9365 | 8503 | 8327 | 8396 | 8106 | 7934 | 8096 | 8280 |
| TUS (psi) | 7497 | 6983 | 7125 | 7070 | 7094 | 7073 | 7111 | 7082 |

*Comparative Examples 14–17 and 19

EXAMPLES 20–25

Table 7 offers further examples of compositions which utilize stearic acid or Hoechst Wax S as the melt flow improving agents.

TABLE 7

|  | CONTROL G | 20 | 21 | 22 | 23 | 24 | 25 |
|---|---|---|---|---|---|---|---|
| MATERIALS |  |  |  |  |  |  |  |
| STEARIC ACID |  | 0.5 | 0.75 | 1 |  |  |  |
| HOECHST WAX S |  |  |  |  | 0.5 | 0.75 | 1 |
| PROPERTIES |  |  |  |  |  |  |  |
| MV @ 540 F. |  |  |  |  |  |  |  |
| 100 sec−1 | 8655 | 8959 | 7870 | 6733 | 8193 | 8787 | 8095 |
| 1500 sec−1 | 2741 | 2259 | 2014 | 1765 | 2413 | 2210 | 1996 |
| HDT (F) @ 66 p | 356 | 358 | 345 | 342 | 345 | 336 | 339 |
| N. Izod (rt) | 8.4 | 4.1 | 4.7 | 4.6 | 4.2 | 8.4 | 4.9 |
| DYNATUP (E) | 634 | 611 | 444 | 595 | 530 | 573 | 505 |

I claim:

1. A compatibilized polyphenylene ether-polyamide composition having improved melt flow characteristics, comprising:
   (a) a polyphenylene ether resin,
   (b) a polyamide resin,
   (c) a compatibilizer compound for a) and b), and
   (d) a melt flow improving amount of a compound selected from the group consisting of straight chain fatty acids and organic carboxylic acids of the formula

R−CO(R)

wherein R is a monovalent alkyl or aralkyl radical having about 4 to 32 carbon atoms and R′ is —OH or halogen, and acid anhydride derivatives thereof, wherein the compatibilizer is selected from the group consisting of:
   (A) a saturated aliphatic polycarboxylic acid or derivative thereof;
   (B) a silane compound comprising at least one silicon atom bonded to a carbon atom via an oxygen bridge and at least one ethylene carbon-to-carbon double bond or a carbon-to-carbon triple bond and/or an amine or mercapto functional group which is not bonded directly to the silicon atom;
   (C) a functionalized polyphenylene ether;
   (D) an oxidized polyolefin wax, optionally in combination with an organic phosphite;
   (E) a copolymer comprising units of a vinyl aromatic compound and an alpha-beta unsaturated dicarboxylic acid or dicarboxylic acid anhydride, or a copolymer with units of a vinyl aromatic compound of an imide compound of an alpha-beta unsaturated dicarboxylic acid; and
   (F) the reaction product of (a) a 1,2-substituted olefinic compound with a carboxyl group or acid anhydride group, (b) a polyphenylene ether, and (c) a radical initiator.

2. A composition as in claim 1 wherein compound (d) is selected from the group consisting of stearic acid, lauric acid, myristic acid, palmitic acid, oleic acid, linoleic acid, linolenic acid, behinic acid, arachidic acid, menhadenic acid, erucic acid and mixtures and acid anhydrides, thereof.

3. A composition as in claim 1 wherein compound (d) is present in an amount of about 0.01 to 10 parts by weight based upon the weight of 100 parts of said polyphenylene ether-polyamide base resin.

4. A composition as in claim 1 wherein compound (d) is present in an amount up to about 0.1 to 3 parts by weight per 100 parts of said polyphenylene ether-polyamide base resin.

5. A composition as in claim 1 wherein said polyphenylene ether resin is a polymer derived principally from 2,6 dimethyl phenylene units and/or 2,3,6-trimethyl phenylene units.

6. A composition as in claim 1 wherein said polyphenylene ether is poly(2,6-dimethyl-1,4-phenylene ether).

7. A composition as in claim 1 wherein said polyamide resin is selected from the group consisting of polyamide 6, polyamide 6,6 polyamide 11, polyamide 12, polyamide 6,3, polyamide 4,6, polyamide 6,10 and polyamide 6,12.

8. A composition as in claim 7 wherein the polyamide resin contains an excess of amine functional groups in relation to said resins concentration of acid functional groups.

9. A composition as in claim 1 wherein said polyphenylene ether resin is present in an amount of 5 to 80 parts by weight and said polyamide resin is present in a corresponding amount of 95 to 20 parts by weight based upon the weight of 100 parts of (a) and (b) taken together.

10. A composition as in claim 2 wherein compound (d) is stearic acid.

11. A composition as in claim 1, further comprising up to about 20 parts by weight of a elastomeric impact strength improving agent, based upon 100 parts by weight of the polyphenylene ether-polyamide base resin.

12. A composition as in claim 1 wherein said compatibilizer compound is present in an amount of 0.01 to 10 parts by weight based upon 100 parts of components (a) and (b) taken together.

13. A composition as in claim 12 wherein the compatibilizer compound is citric acid.

* * * * *